(12) United States Patent
Grau et al.

(10) Patent No.: US 7,516,942 B2
(45) Date of Patent: Apr. 14, 2009

(54) PLUG-STYLE AIR-CONDITIONING SERVICE VALVE

(75) Inventors: Jeffrey M. Grau, North Ridgeville, OH (US); Thomas C. Trent, Fort Wayne, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 338 days.

(21) Appl. No.: 11/440,632

(22) Filed: May 25, 2006

(65) Prior Publication Data

US 2007/0205387 A1      Sep. 6, 2007

Related U.S. Application Data

(63) Continuation-in-part of application No. 10/982,510, filed on Nov. 6, 2004, now Pat. No. 7,051,996.

(60) Provisional application No. 60/523,508, filed on Nov. 19, 2003, provisional application No. 60/716,772, filed on Sep. 13, 2005.

(51) Int. Cl.
*F16K 5/00* (2006.01)
(52) U.S. Cl. .................. 251/309; 251/152; 251/314
(58) Field of Classification Search .......... 251/142, 251/152, 309, 314; 137/380, 382
See application file for complete search history.

(56) References Cited

U.S. PATENT DOCUMENTS

| | | | |
|---|---|---|---|
| 1,274,103 A | 7/1918 | Story | |
| 1,634,813 A | 7/1927 | Whitehead | |
| 2,510,514 A | 6/1950 | Mueller | |
| 3,186,437 A | 6/1965 | Buono | |
| 3,783,890 A | 1/1974 | Wurzburger | |
| 3,802,457 A | 4/1974 | Wurzburger | |
| 4,262,880 A | 4/1981 | Danko et al. | |
| 4,918,768 A | 4/1990 | DeSousa et al. | |
| 4,982,760 A * | 1/1991 | Mustaklem | 137/559 |
| 5,219,149 A * | 6/1993 | Combeau | 251/309 |
| 5,234,193 A | 8/1993 | Neal, Jr. et al. | |
| 5,372,158 A * | 12/1994 | Berfield | 137/217 |
| 5,531,195 A * | 7/1996 | Onoda et al. | 277/442 |
| 6,068,023 A | 5/2000 | Potter | |
| 6,216,473 B1 | 4/2001 | Arii | |

(Continued)

*Primary Examiner*—John K Fristoe, Jr.
(74) *Attorney, Agent, or Firm*—Robert J. Clark; Daniel J. Whitman; Joseph J. Pophal

(57) ABSTRACT

An air-conditioning service plug-type valve includes a valve body having a chamber. First and second openings extend through the valve body. The air conditioning plug-type valve also includes a stem having a plug portion configured for being received in the chamber of the valve body. The stem, when the plug portion is received in the chamber, is rotatable relative to the valve body between a closed position blocking fluid communication between the first and second openings of the valve body and an open position enabling fluid communication between the first and second openings of the valve body. The plug portion includes a fluid blocking portion located immediately adjacent the first opening when the stem is in the closed position. A groove extends into a peripheral surface of the plug portion defining the fluid blocking portion. A seal is disposed in the groove and extends between the plug portion and the valve body. The seal, when located in the groove, is stretched by at least a predetermined amount. The predetermined amount is an amount sufficient to offset refrigeration medium absorption effects thereon.

12 Claims, 13 Drawing Sheets

U.S. PATENT DOCUMENTS 6,546,952 B1 * 4/2003 Martin et al. .......... 137/315.27
6,874,759 B2 4/2005 Aoshima et al.
6,964,280 B1 11/2005 Trimble et al.
6,988,510 B2 1/2006 Enerson

* cited by examiner

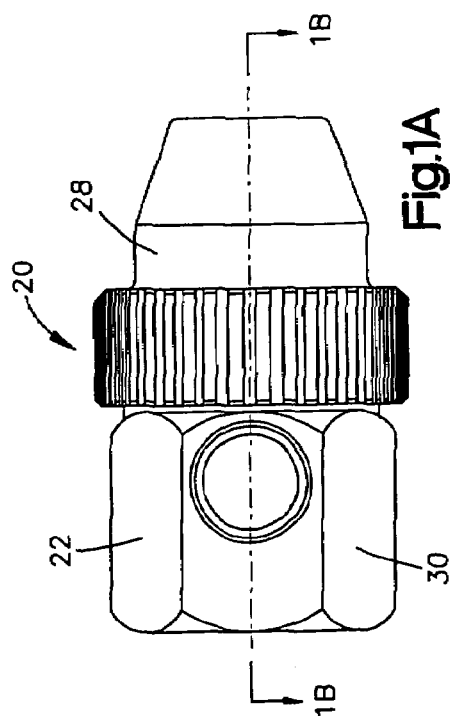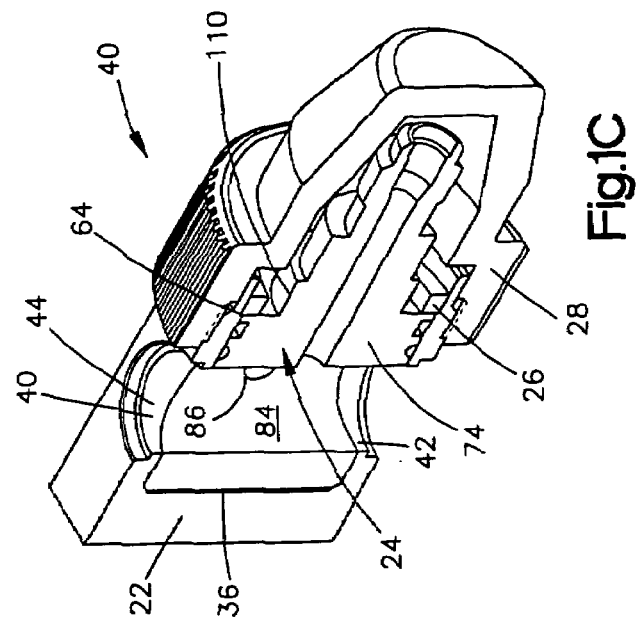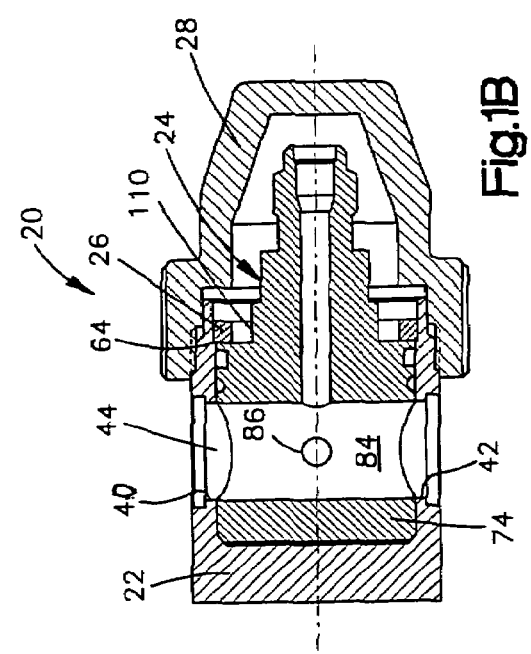

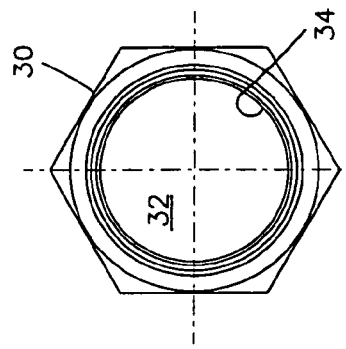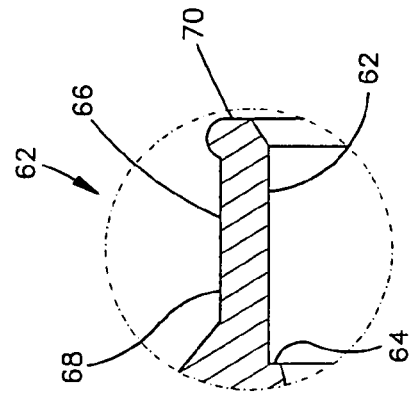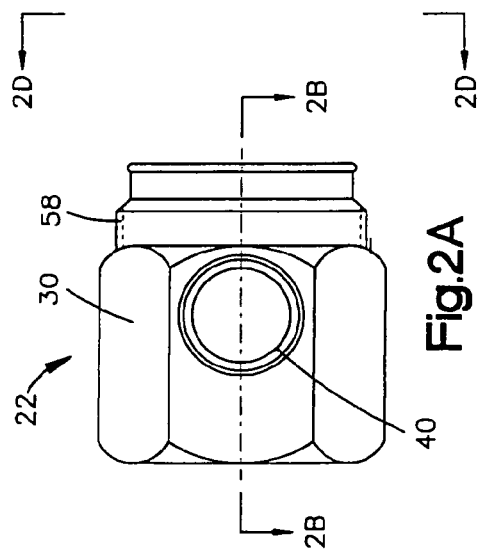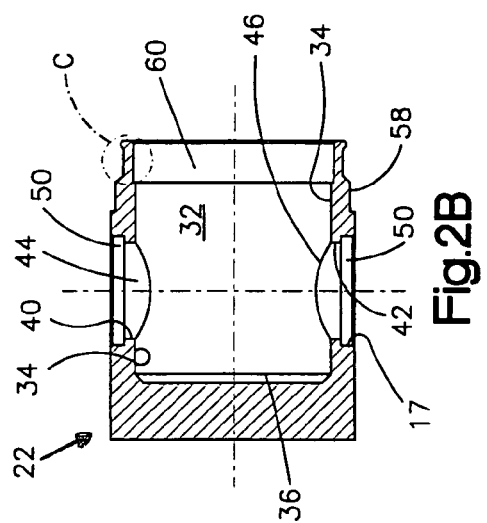

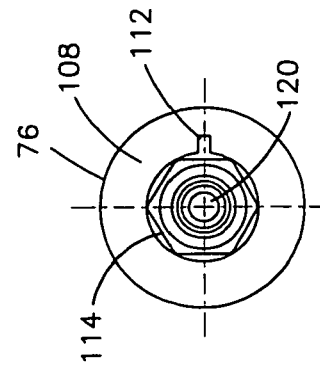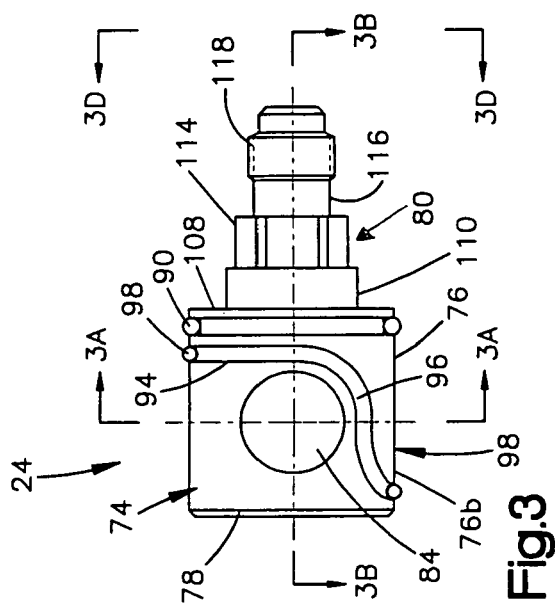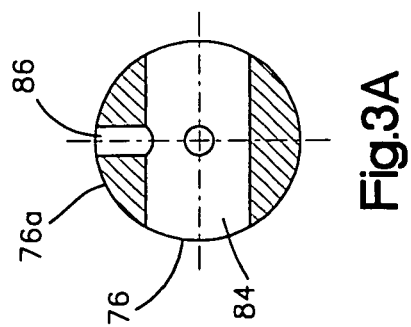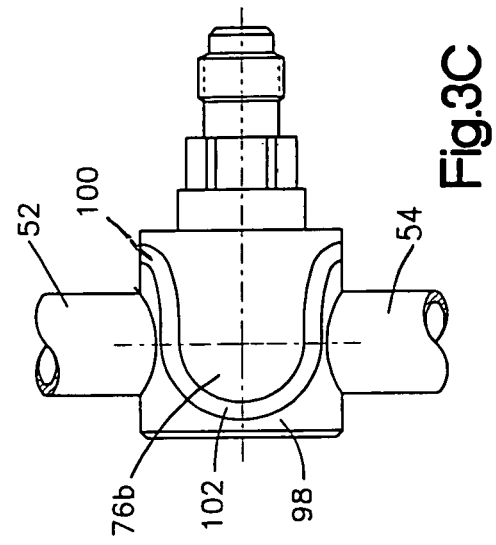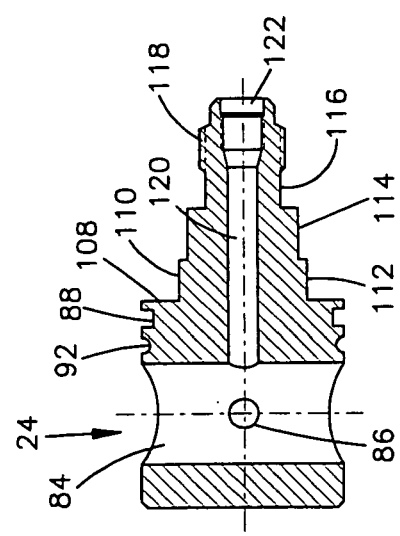

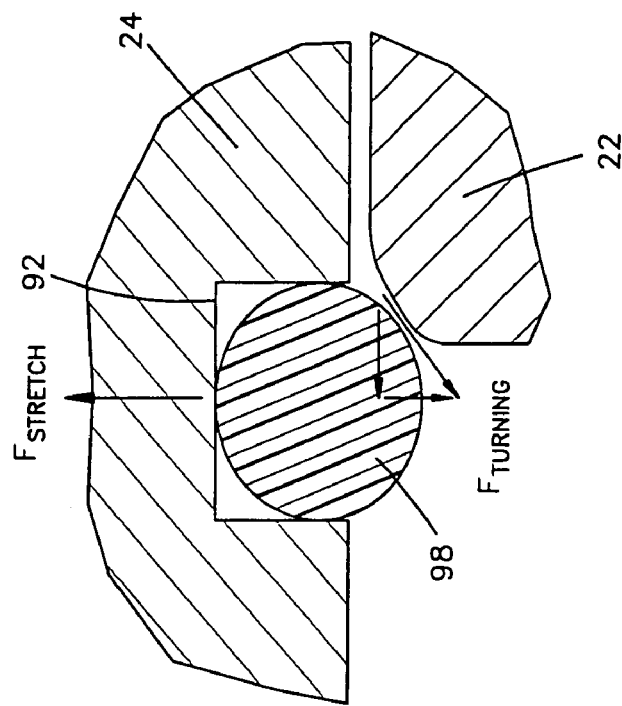
Fig. 7
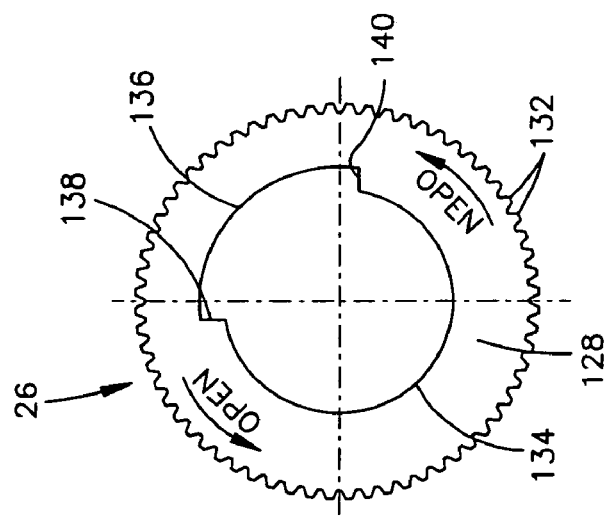
Fig. 4B
Fig. 4A

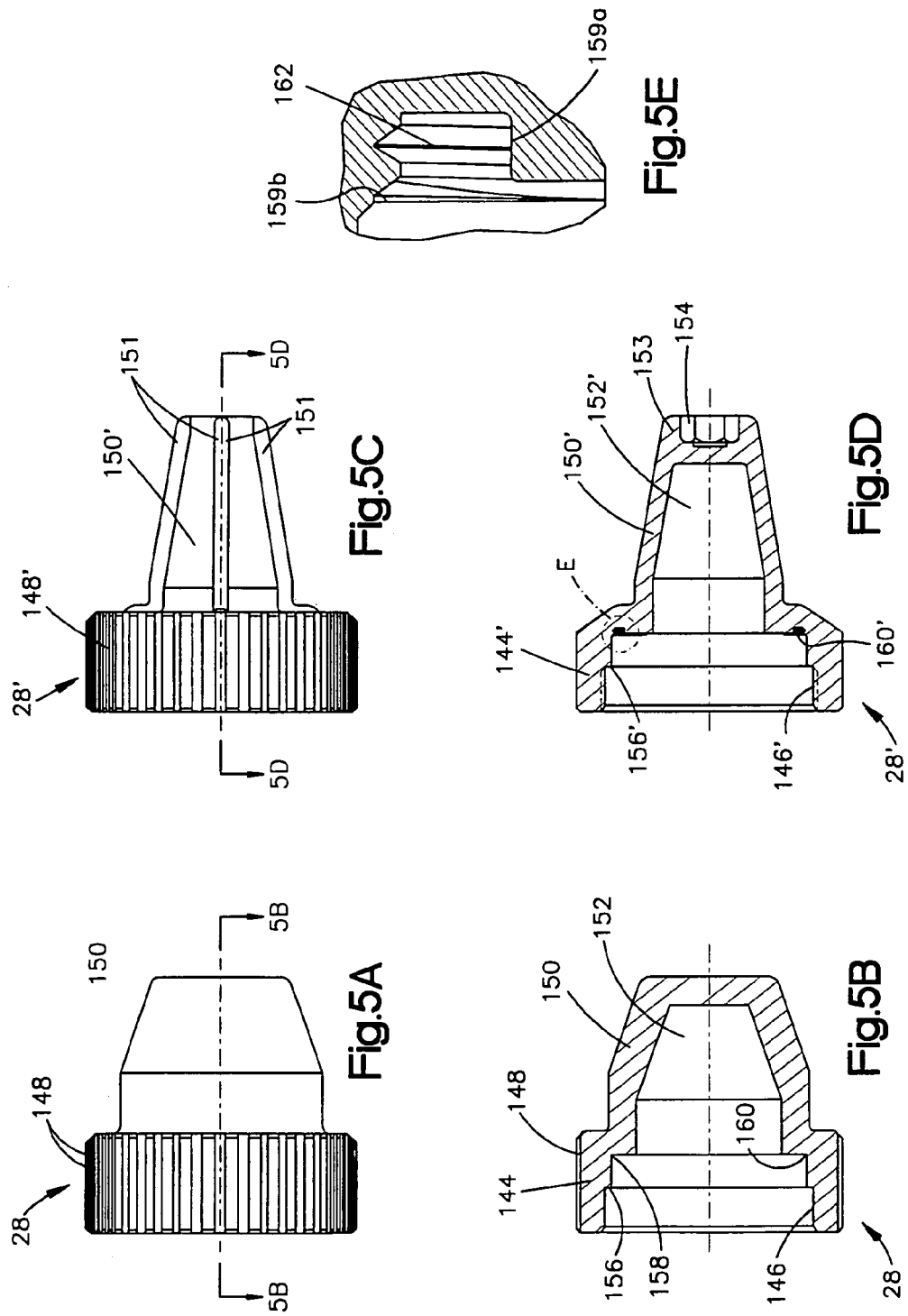

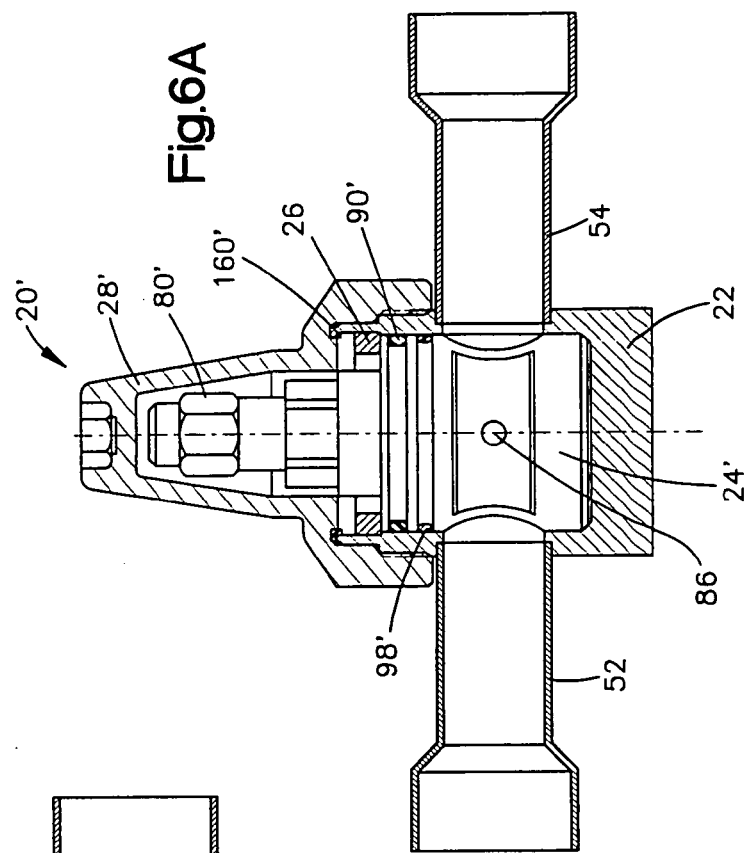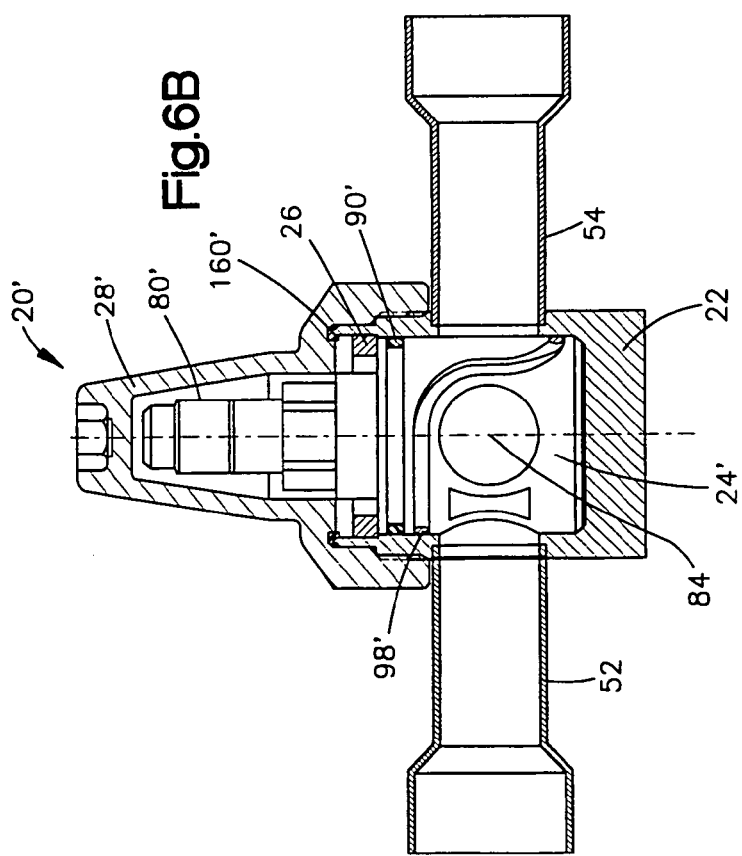

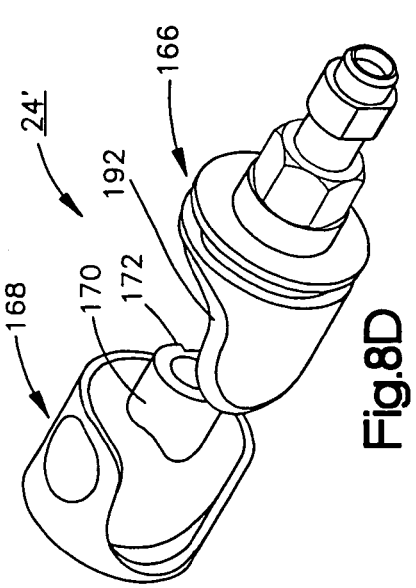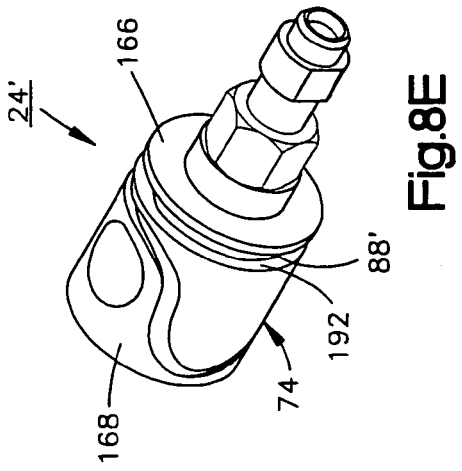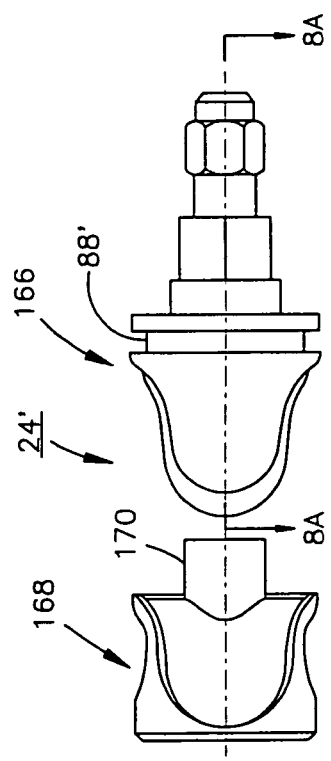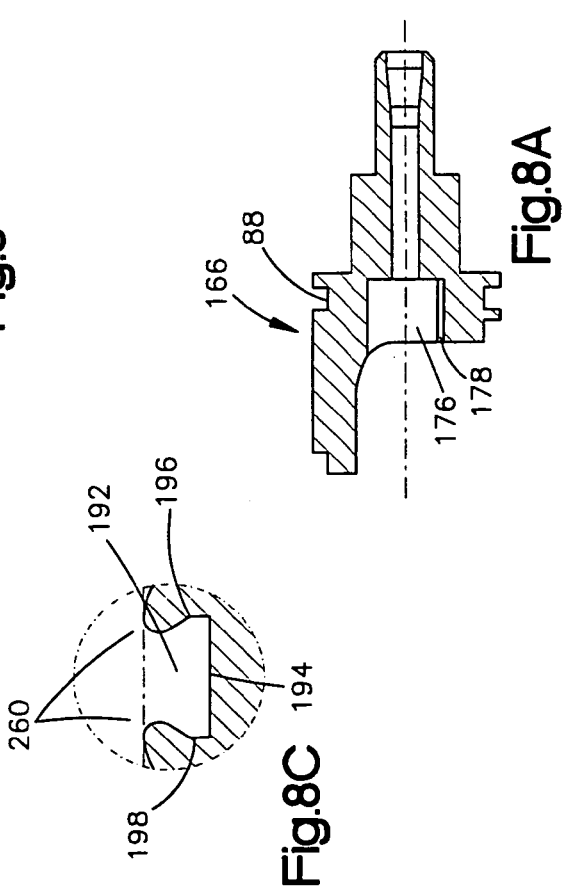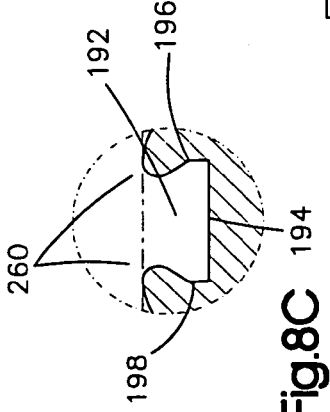

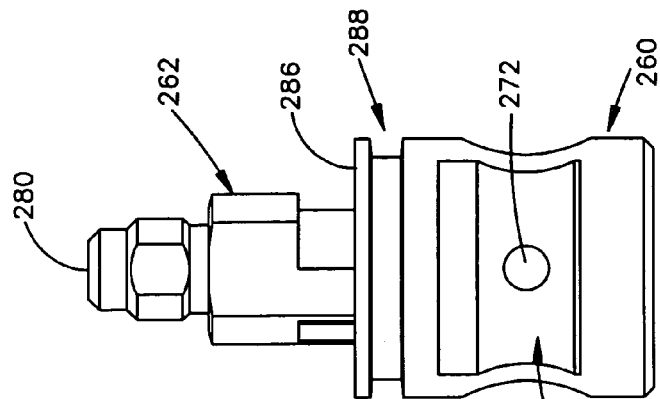
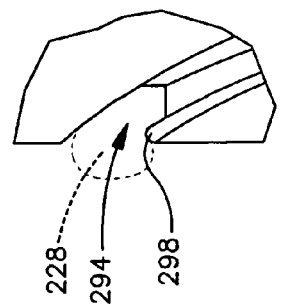
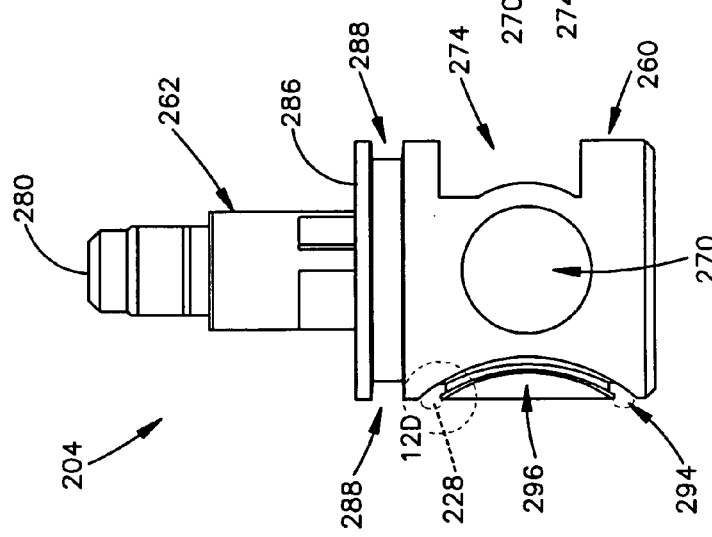
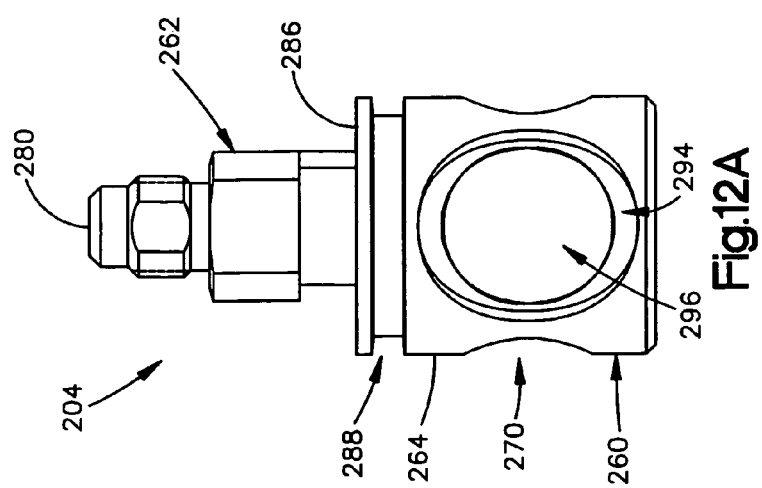
Fig.12C
Fig.12D
Fig.12B
Fig.12A

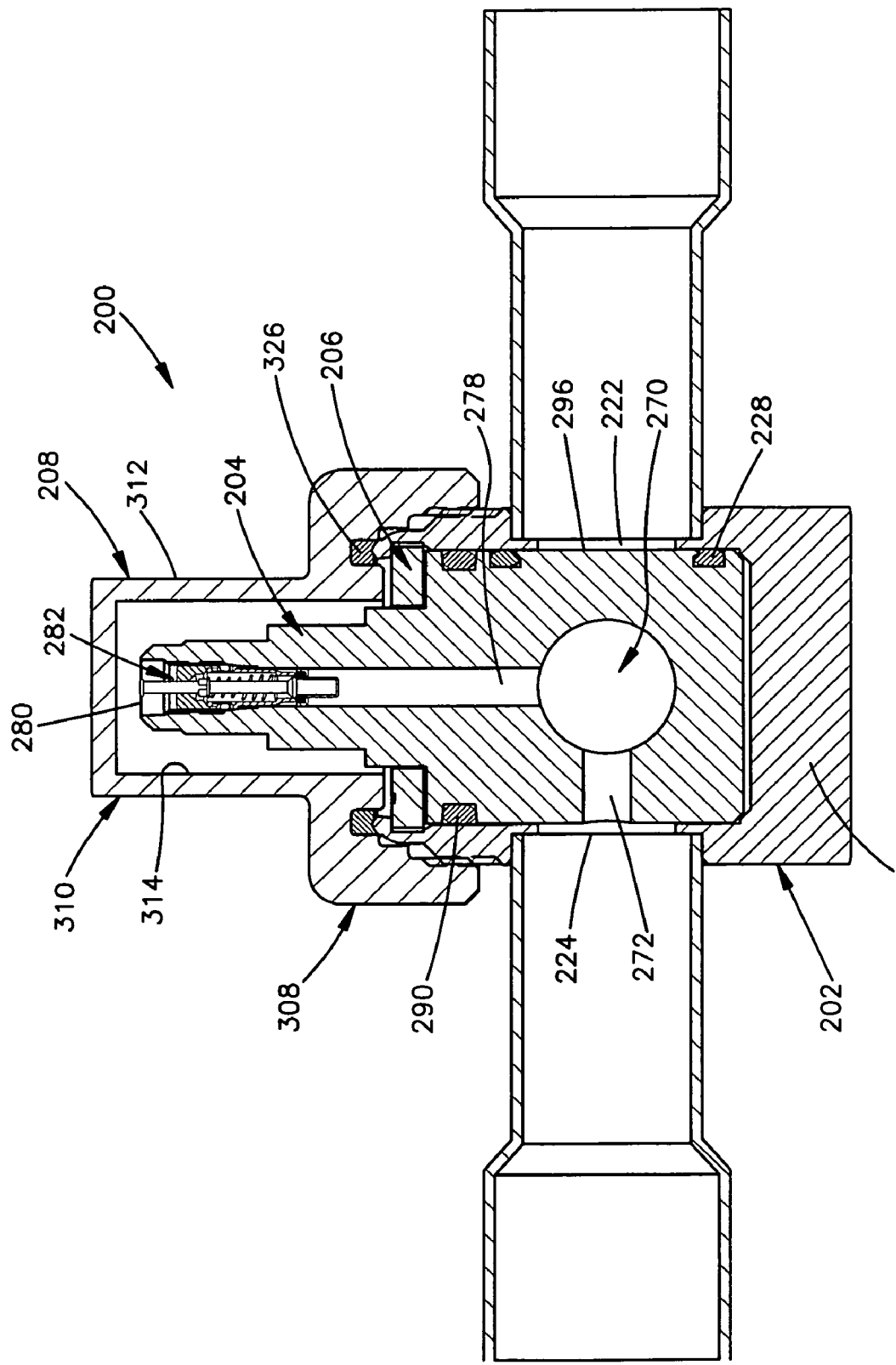

PLUG-STYLE AIR-CONDITIONING SERVICE VALVE

CROSS-REFERENCE TO RELATED CASES

This application is a continuation-in-part of application Ser. No. 10/982,510, filed Nov. 6, 2004, now U.S. Pat. No. 7,051,996 which claims priority to provisional patent application Ser. No. 60/523,508 filed Nov. 19, 2003. The disclosures of which are incorporated herein by reference in their entirely. This application also claims the benefit of the filing date of U.S. provisional patent application Ser. No. 60/716,772, filed Sep. 13, 2005, the disclosure of which is incorporated herein by reference in its entirety.

FIELD OF THE INVENTION

The present invention pertains to a plug-style valve, e.g., for use as air-conditioning service valves that previously traditionally used front seat valve designs. More particularly, the invention utilizes, among other things, a plug that includes an intermediate O-ring disposed in an intermediate O-ring seal groove with this O-ring being stretched, preferably in excess of about 15%, to offset refrigeration medium absorption effects thereon.

BACKGROUND OF THE INVENTION

A condensing unit is a key component of a typical residential split air-conditioning and heat pump system, wherein the condensing unit is primarily comprised of the compressor, the outdoor coil, fan and connections. During the installation of such a system, the outdoor unit is connected to two lines (high and low side) that convey refrigerant medium to and from the indoor coil and expansion device. These two connections, on the condensing unit, are made at the liquid (high side) and the suction (low side) service valves. Since the suction side service valve conveys gaseous refrigerant medium, it is a substantially larger valve than the liquid side service valve that conveys the liquid refrigerant medium. After the necessary braze connection is made, these lines, between the indoor and outdoor coils, are evacuated of air through charge ports located on the service valves. Thereafter, the shut-off valves are opened thus allowing pre-charged refrigerant medium to flow from the condensing unit throughout the noted system.

The main functions of a typical state of the air-conditioning service valve are to:

1. Retain pre-charged refrigerant medium in the condensing unit before installation;
2. Provide a shut-off for the possibility of a "pump-down". During the "pump-down" process, the liquid service valve is closed and the compressor is turned on so that the refrigerant medium is conveyed to and stored in the condensing unit. Once this process is completed, the suction line service valve is closed. In this way the indoor coil, expansion device, and connecting lines can be accessed without removing the refrigerant medium from the system; and
3. Provide a service port via which a hose connection can be used to evacuate the refrigerant medium or monitor the system pressure for diagnostic purposes.

A typical state of the art air-conditioning service valve exhibits a generally "Z" flow path inherent in a front seat valve design which, however, is not conducive to a low pressure drop. While a pressure drop, in the liquid line of the system, is not usually detrimental to system performance, a suction line pressure drop causes a definite decrease in system efficiency. Therefore, the suction side service valve design has developed a design stratification whereby the flow path and subsequent pressure drop associated with this valve have become important features. Some condensing unit manufacturers utilize a ball-style valve that exhibits a large straight flow path, but the cost of this valve is substantially higher than that of the usual front seat valve. Not surprisingly, many manufacturers prefer the lower cost of the usual front seat valve for the suction service valve application and will compensate for the added pressure drop, and its associated efficiency losses, via design changes in other areas of the system. Another benefit of the ball-style valve is the ease of actuation of the valve stem in that turning the ball valve stem but one quarter turn will cause the valve to open or close, while the front seat style valve requires multiple complete rotations of its valve stem to either open or close the valve.

The construction of the present invention employs a valve style that is presently not used in residential air-conditioning and heat pump applications, namely a plug-style valve. The use of a plug valve is advantageous in the suction side service valve application since the flow path thereof is straight through the valve body, a key characteristic in pressure drop considerations. In addition, the through-hole in the stem of the plug valve can readily be sized for reduced pressure drop, and a plug-style valve requires only a minimal actuation motion, similar to that of a ball valve.

One of the challenges encountered in the state of the art plug valves, such as the one set forth in U.S. Pat. No. 5,234,193, to Neal Jr., also assigned to the assignee of the present invention, is the difficulty in retaining the circular seal on the side of the valve's stem. The noted patent structure uses a press-in-place custom seal that can be difficult to assemble. Other plug-type valves, such as the one shown in U.S. Pat. No. 4,262,880, to Danko, et al., rely on an O-ring that is held in the side of the stem by the dovetail nature of its receiving gland, whereas the present invention uses a serpentine gland that permits the O-ring to be stretched substantially around the valve's stem as an improved means to retain the seal or O-ring in its groove or gland.

The previously-noted prior art plug valves use a seal on the side of the valve stem to seal off the valves' through holes when the valves are closed. When the valves are opened, this seal is not utilized, and a second O-ring around the top of the valve becomes the primary seal against leakage between the stem and the valve body. The unique shape of the present invention serpentine gland allows the O-ring located therein to be so positioned that it functions as the primary seal against stem/body leakage when the valve is in the open position. In the present invention, the other O-ring around the top of the stem is the primary seal only when the valve is closed and a secondary seal when the valve is open. This is of particular importance since an air-conditioning service valve requires that the valve be in its open position almost exclusively after the system has been installed. In addition, the thus double O-ring seal, in the open position, allows for the use of a soft seal, not the customary metal-to-metal seal.

A further difficulty faced by the state of the art plug valves is the possibility of the seal being damaged by the edge formed by the inside diameter of the valve body and the valve's lateral through holes since the seal does contact this edge during the actuation of the valve stem. Furthermore, the seal can also contact the noted edges during the initial assembly of the valve if, at that time, the seal is not positioned away from the valve's through holes. In the structure of the present invention, the location of the serpentine gland portion that extends around the top of the valve stem allows for the serpentine O-ring to be located away from these edges during the assembly step.

The patent literature includes a plurality of plug-type valve constructions including: U.S. Pat. No. 3,186,437 to Buono that includes a pointer that indicates the position of a valve passage within the valve body; U.S. Pat. No. 3,783,890 to Wurzburger, U.S. Pat. No. 3,802,457 also to Wurzburger, U.S. Pat. No. 5,219,149 to Combeau, and U.S. Pat. No. 5,372,158 to Berfield, all of which pertain to plug-type valves that employ varying styles of serpentine seals; while U.S. Pat. No. 6,216,473 B1 pertains to an air-conditioning service valve structure that is similar to that of the present invention only in that it also utilizes a service port. In this structure, specifically as shown in FIG. 7, fluid flows to a recovery circuit via fluid recovery inlet port 1105A, but fluid can still flow, albeit via leakage, from inlet 1102A to outlet 1102B, since peripheral seals 1110 only prevent horizontal or lateral leakage when inlet 1102A is aligned with outlet 1102B as shown in FIG. 8, but not peripheral leakage in the FIG. 7 position. However, none of these prior art constructions teach or suggest the unique valve structure of the present invention.

SUMMARY OF THE INVENTION

Accordingly, in order to overcome the deficiencies of the prior art devices, the innovative plug-style valve of the present invention provides specific advantages over the plug-style valves used in other industries as well as the state of the art air-conditioning service valves. Advantages over traditional air-conditioning service valves include:

the plug-style valves of the present invention provide a lower pressure drop through the valve, similar to that of ball valves but at a lower cost;

the plug-style valve of the present invention provides for a minimal actuation motion, namely one quarter turn, like ball valves but at a lower cost, as opposed to the required multiple full rotations of the front-seat valve;

one of the difficulties a condensing unit manufacturer faces when mounting the state of the art service valve is locating same such that the actuation stem and service fitting thereof are easily accessible to a service technician. This can be challenging considering that there are two valves (gas and liquid), each having an actuation stem and a service fitting on adjacent sides of the valve. The plug valve of the present invention locates the service fitting integrally within the valve's actuation stem, thus easing mounting configuration considerations for the condensing unit manufacturer while also providing easier access for the service technician;

by locating the service fitting integrally within the valve's actuating stem, it allows the number of sealing caps on the valve to be reduced. Only one cap can now provide a redundant seal and protect both the actuation stem and the service fitting; and the use of multiple seals, such as O-rings, allows for the elimination of metal-to-metal seals on the actuation stem and the valve cap. This permits simpler (lower strength requirement) and lower cost valve mounting options.

Specifically, in terms of structure, in this invention an air conditioning service plug-type valve, comprises in combination: a. a valve body having a chamber and an inlet opening and an outlet opening communicating with the chamber, the valve body including, at an open end of the chamber, an exteriorly threaded portion and a generally cylindrical pocket portion having;

a deformable collar;

a stem, including a generally cylindrical plug with a peripheral surface, located on one end and a contiguous actuating portion extending from another end thereof, the plug being disposed within the chamber and being rotatable within the chamber, about an axis between a closed position and an open position;

the plug including a first, through, lateral passageway communicating with the inlet and outlet openings when the plug is in the open position, thereby providing a first flowpath for the fluid through the valve, the inlet and outlet openings, together with the first lateral passageway, being disposed along a straight axis when the plug is in the open position;

the plug further including a second lateral passageway normal to, emanating from and communicating the first lateral passageway with the valve body chamber;

a first seal, disposed between the valve body and the plug in a first seal groove in the plug peripheral surface;

a second seal, disposed between the valve body and the plug in a second seal groove, of a serpentine shape and including contiguous first and second seal groove portions, in the plug peripheral surface, the second seal being stretched a predetermined amount during its installation into the second seal groove and being spaced apart from the first seal and defining, therebetween and the valve body and the plug, a closed volume without the first lateral passageway;

the second seal, upon installation thereof in the second seal groove assumes the shape of the second seal groove, thus including first and second contiguous seal portions, the first seal portion being disposed above the inlet and outlet openings, the second seal portion extending from one end of the first contiguous seal portion downwardly to below the inlet and outlet openings and then back upwardly to another contiguous end of the first seal portion such that one of the inlet and outlet openings is disposed within the closed volume and the other of the inlet and outlet openings is disposed outside of the closed volume when the plug is in the closed position;

the stem contiguous actuating portion including a generally cylindrical portion, including a radially extending stop member, adjoining the plug, a tool-receiving portion adjoining the generally cylindrical stem portion, and a service fitting adjoining the tool-receiving portion, the stem further including a central axial passageway normal to, emanating from and communicating the first lateral passageway with the service fitting, the service fitting being adapted for receiving a valve core for refrigerant medium charging purposes;

a generally annular retainer member positioned around the stem cylindrical portion, axially within the valve body pocket portion, with the inside diameter of the retainer member being smaller than the diameter of the plug and having a recessed portion of a predetermined circumferential extent, with the stop member being received within the recessed portion, the valve body deformable collar being adapted to be radially inwardly swaged over the retainer member during the assembly of the valve;

a cap for sealing the valve cavity and protecting the stem actuating portion, the cap including an interiorly threaded base portion, adapted to mate with the threaded valve body portion, and an integral truncated closure portion having an internal cavity for covering the service fitting and valve core; and a third seal, located in an internal gland portion of the cap, adapted for sealing the cap against the valve body swaged collar portion, upon assembly of the cap onto the valve body.

In one version of this air conditioning service plug-type valve, the second lateral passageway is angularly spaced about 90 degrees from the first lateral passageway.

In another version of the air conditioning service plug-type valve, the second seal groove includes a second seal first groove portion being substantially parallel with the first seal first groove, for retaining the second seal first portion, and a contiguous second seal second groove portion, the second groove portion being generally U-shaped in its angular extent, for supporting the second seal second portion.

In further versions of the air conditioning service plug-type valves, the second seal first groove portion is substantially semicircular in angular extent, and the second seal second groove portion is substantially semicircular in angular extent, or each of the second seal first and second groove portions are substantially semicircular in angular extent.

In yet other versions of the air conditioning service plug-type valves, the amount of stretching of the second seal is in excess of about 15%.

The present invention also pertains to a stem in an air conditioning service plug-type valve, wherein the stem, comprises:

a generally cylindrical plug with a peripheral surface, located on one end thereof and a contiguous actuating portion extending from another end thereof, the plug being disposed in valve body having a chamber and inlet and outlet openings communicating with the chamber, the plug being rotatable within the chamber about an axis between a closed position and an open position;

the plug including a first, lateral through passageway communicating with the inlet and outlet openings when the plug is in the open position, thereby providing a first fluid path through the valve, the inlet and outlet openings, together with the first passageway, being disposed along a straight axis when the plug is in the open position;

the plug further including a second lateral passageway normal to, emanating from and communicating the first lateral passageway with the valve body chamber;

a first seal groove in the plug peripheral surface for retaining a first seal therein;

a second seal groove in the plug peripheral surface, of a serpentine shape, for retaining a second seal therein, the second seal being stretched a predetermined amount during its installation into the second seal groove and being spaced apart from the first seal groove and defining, therebetween and the valve body and the plug, a closed volume without the first lateral passageway; and the contiguous actuating portion including a generally cylindrical portion including a radially extending stop member, adjoining the plug, a tool-receiving portion adjoining the generally cylindrical portion, and a service fitting adjoining the tool-receiving portion, the stem further including a central axial passageway normal to, emanating from and communicating the first lateral passageway with the service fitting, the service fitting being adapted for receiving a valve core for refrigerant medium charging purposes.

In another version in the stem of this invention, the second seal groove includes a second seal first groove portion, substantially parallel with the first seal groove, for retaining the second seal first portion, and a contiguous second seal second groove portion, substantially U-shaped, for retaining the second seal second portion.

In a further version, in the stem of this invention, at least one of the second seal first and second groove portions is substantially semicircular in angular extent.

In still an additional version of the stem of this invention, the amount of stretching of the second seal is in excess of about 15%.

In a differing version of the stem of this invention, the second lateral passageway is angularly spaced about 90 degrees from the first lateral passageway.

This invention also pertains to plug-style valves used in applications other than in air-conditioning systems, namely a plug-type valve comprising in combination:

a valve body having a central chamber and angularly spaced inlet and outlet openings communicating with the chamber, the valve body including, at an open end of the chamber, a threaded portion and a generally cylindrical pocket portion having a deformable collar;

a stem, including a cylindrical plug with a peripheral surface, located at end and an integral actuating portion extending from another end thereof, the plug being disposed within the chamber and being rotatable about an axis between closed and open positions;

the plug including a primary lateral through passage communicating with the inlet and outlet openings when the plug is in the open position, thereby providing a first flowpath through the valve, the inlet and outlet openings, together with the primary passage, being coaxial when the plug is in the open position;

the plug further including an auxiliary lateral passage normal to, emanating from and communicating the primary passage with the valve body chamber, the auxiliary passage being angularly disposed about 90 degrees from the primary lateral passage;

an end O-ring, disposed between the valve body and the plug in an end seal groove in the plug peripheral surface;

an intermediate O-ring, disposed in the plug peripheral surface between the valve body and the plug in an intermediate O-ring groove of a serpentine shape and having integral first and second O-ring portions, the intermediate O-ring being stretched a predetermined amount during its installation into the intermediate O-ring groove and defining, therebetween and the valve body and the plug, a closed volume without the primary passage;

the intermediate O-ring, upon the installation, assuming the serpentine shape of the intermediate O-ring groove, thus including first and second integral O-ring portions, the first O-ring portion being disposed on one side of the inlet and outlet openings, the second O-ring portion extending therefrom to another side of the inlet and outlet openings and then back to another end of the first O-ring portion such that one of the inlet and outlet openings is disposed within the closed volume and the other of the inlet and outlet openings is disposed outside of the closed volume when the plug is in the closed position;

the stem actuating portion including a cylindrical stem portion, having a stop member, adjoining the plug, a tool-receiving portion adjoining the stem portion, and a service fitting adjoining the tool receiving portion, the stem further including a central axial passage normal to, emanating from and communicating the primary lateral passage with the service fitting, the latter including a valve core for gaseous medium charging purposes;

an annular retainer member positioned around the cylindrical stem portion, axially within the valve body pocket portion, with the inside diameter of the retainer member being of a diameter smaller than that of the plug and including a recessed portion, with the stop member being received therein, the valve body deformable collar being inwardly deformed over the retainer member;

a cap, for sealing the valve cavity and the stem actuating portion, having a threaded base portion, for mating with the valve body threaded portion, and an integral closure portion having an internal cavity for covering the service fitting; and a cap seal, located within the cap, for sealing the valve body deformed collar portion.

In a version of the previous embodiment, the intermediate O-ring groove includes a first groove portion, substantially parallel with the end O-ring groove, for retaining the intermediate O-ring first portion, and an integral intermediate O-ring second groove portion, of general U-shape in its angular extent, for retaining the intermediate O-ring second portion.

In a further version of the previous embodiment, the angular extent of at least one of the intermediate O-ring first and second portions is about 180 degrees.

In another version of the previous embodiment, the amount of stretching of the intermediate O-ring is in excess of about 15%.

In yet another embodiment, an air conditioning service plug-type valve comprises a valve body having a chamber. First and second openings extend through the valve body. The air conditioning service plug-type valve also includes a stem having a plug portion configured for being received in the chamber of the valve body. The stem, when the plug portion is received in the chamber, is rotatable relative to the valve body between a closed position blocking fluid communication between the first and second openings of the valve body and an open position enabling fluid communication between the first and second openings of the valve body. The plug portion includes a fluid blocking portion located immediately adjacent the first opening when the stem is in the closed position. A groove extends into a peripheral surface of the plug portion defining the fluid blocking portion. A seal is disposed in the groove and extends between the plug portion and the valve body. The seal, when located in the groove, is stretched by at least a predetermined amount. The predetermined amount is an amount sufficient to offset refrigeration medium absorption effects thereon.

In one embodiment, the predetermined amount that the seal is stretched is in excess of about 15%.

The seal surrounds the first opening in the valve body when the stem is in the closed position. The fluid blocking portion is one of a circular and an oval shape. In one embodiment, the groove includes at least one dovetailed surface for helping to retain the seal in the groove.

In yet another variation, the seal includes an anti-abrasion coating that provides enhanced seal lubricity and enhanced wear resistance. The coating may further help to restrict fluid absorption by the seal, thereby restricting swelling of the seal. In one embodiment, the coating is approximately 0.0005 to 0.0008 inches thick.

The previously-described advantages and features, as well as other advantages and features, will become readily apparent from the detailed description of the preferred embodiments that follow.

BRIEF DESCRIPTION OF THE DRAWINGS

FIG. 1A is a top plan view of one embodiment of the plug-style air conditioning service valve of this invention;

FIG. 1B is a longitudinal sectional view, taken along line 1B-1B of FIG. 1A, showing the main components thereof;

FIG. 1C is a perspective view, in longitudinal section, similar to that of FIG. 1B, with a like showing;

FIG. 2A is a top plan view of the valve body, in an unassembled condition, of the valve of this invention;

FIG. 2B is a longitudinal sectional view, taken along line 2B-2B of FIG. 2A;

FIG. 2C is an enlargement of circled area C of FIG. 2B;

FIG. 2D is an end view, looking in the direction of line 2D-2D, adjacent to FIG. 2A;

FIG. 3 is a top plan view, with the seals shown in section, of a first embodiment of a valve stem of the present invention showing same in a first position;

FIG. 3A is a lateral sectional view, taken along line 3A-3A of FIG. 3;

FIG. 3B is a longitudinal sectional view, taken along line 3B-3B of FIG. 3;

FIG. 3C is a further top view of the first embodiment of a valve stem of the present invention showing same in a second position, rotationally displaced from the position of FIG. 3;

FIG. 3D is an end view, looking in the direction of line 3D-3D, adjacent to FIG. 3;

FIG. 4A is a top plan view of the valve retainer member of the present invention;

FIG. 4B is an end view of the retainer member of FIG. 4A;

FIG. 5A is a top plan view of a first embodiment of a valve sealing cap of the present invention;

FIG. 5B is a longitudinal sectional view, taken along line 5B-5B of FIG. 5A, showing the interior structure thereof;

FIG. 5C is a top plan view of a second embodiment of a valve sealing cap of the present invention;

FIG. 5D is a longitudinal sectional view, taken along line 5D-5D of FIG. 5C, showing the interior thereof;

FIG. 5E is an enlargement of circled area E of FIG. 5D;

FIG. 6A is a longitudinal view, partly in section, of the valve of the present invention, showing same in an open position;

FIG. 6B is a view, similar to that of FIG. 6A, but showing the valve in a closed position;

FIG. 7 is a free body diagram illustrating the effect of frictional forces acting on an O-ring seal used in the present invention;

FIG. 8 is an exploded top plan view of a second embodiment, including a two-part valve stem, of the present invention;

FIG. 8A is a longitudinal sectional view, taken along line 8A-8A of FIG. 8, showing one part of this two-part valve stem;

FIG. 8C is an enlargement of the second sealing groove, in its installed position, in FIG. 8E;

FIG. 8D is an exploded perspective view, similar to that of FIG. 8 but angularly rotated relative thereto;

FIG. 8E is a perspective view, similar to that of FIG. 8D, but showing the completed assembly of this two-part valve stem;

FIGS. 12A-12C are plan views of stem of the plug style air conditioning service valve of FIG. 9;

FIG. 12 D is an enlarged view of a portion of FIG. 12B;

FIG. 14B is a view, similar to that of FIG. 14A, but showing the stem of the valve in a closed position.

DETAILED DESCRIPTION OF THE INVENTION

Figure 9:
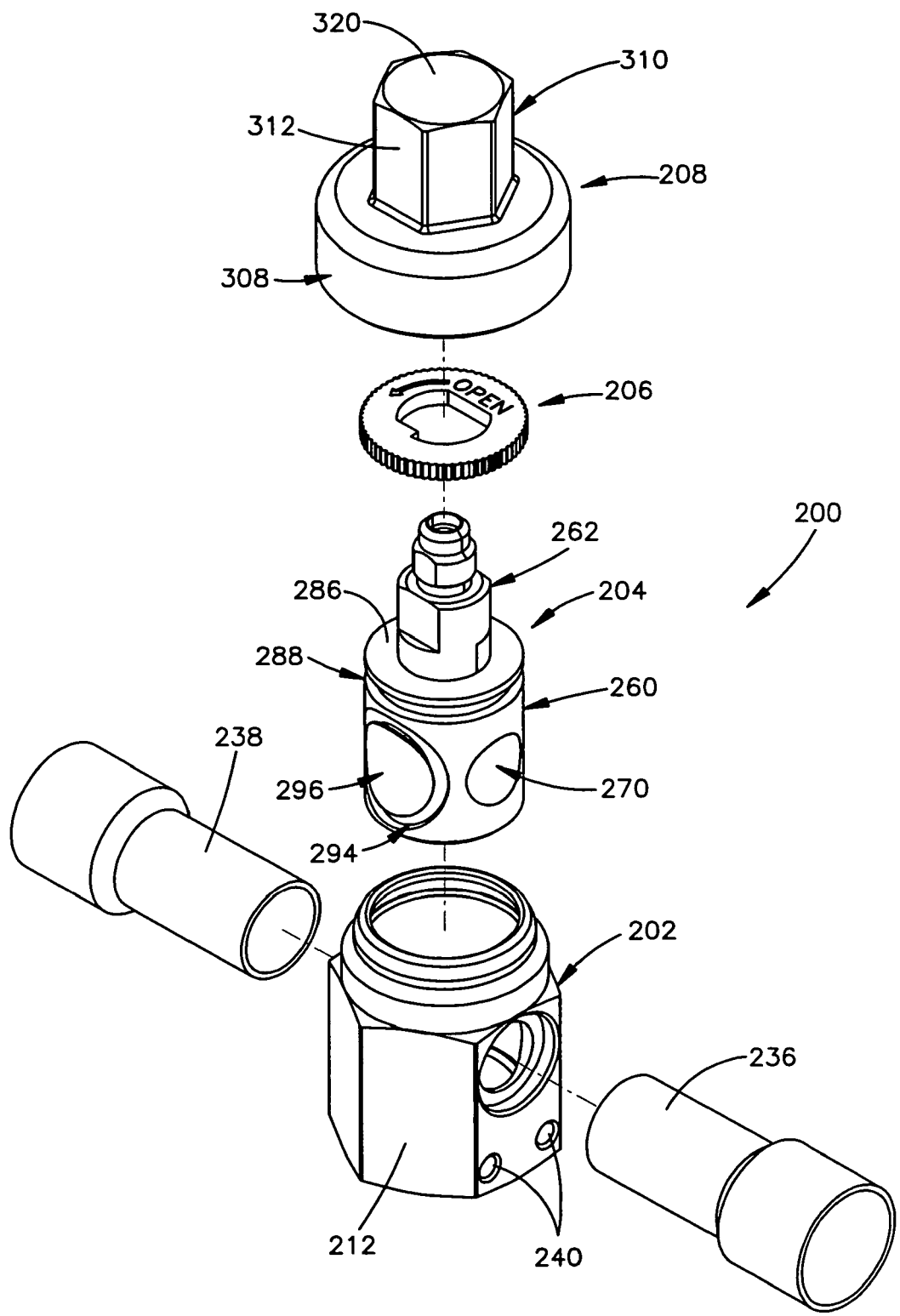
FIG. 9 is an exploded view of a third embodiment of the plug style air conditioning service valve of the present invention.

While only a few main embodiments of this invention will be described, the invention should not be construed as being limited to the particular forms described herein which are to be regarded as illustrative rather than restrictive. Therefore, variations and changes may be made by those skilled in the art without departing from either the scope or spirit of the invention.

Turning now to the several drawings, illustrated in FIGS. 1A, 1B and 1C are the main components of a first embodiment 20 of the Plug-style Air Conditioning Service Valve (hereinafter "valve") of the present invention, namely: valve body 22, stem 24, retainer 26 and cap 28. FIGS. 2A, 2B, 2C and 2D illustrate valve body 22 in detail, with body 22 preferably being constructed of a metallic alloy and having a hexagonally-shaped outer surface 30. Valve body 22 includes a longitudinal, central, generally cylindrical chamber, cavity or bore 32, having a cylindrical inner surface 34 and a predetermined inner diameter 36, into which stem 24 is inserted or assembled, as best seen in FIGS. 1B and 1C. Valve body 22 further includes lateral, coaxial inlet and outlet openings 40, 42, respectively, which together define a valve body lateral through bore 44, with openings 40, 42 being chamfered or relieved to break their inner sharp edges 46, at chamber cylindrical surface 34, in order to protect a seal 98 (FIG. 3C) to be discusses in detail later. Valve body 22, at openings 40,42 also includes opposed braze pockets 50, into which the ends of tubing portions, such as those shown as 52 in FIG. 3C, can be brazed. A pair of mounting holes 48 is located near the closed end of valve body 22.

Valve body 22 additionally includes, near the open end of chamber 32, an exteriorly threaded portion 58 and an integral or contiguous longitudinally extending, cylindrical pocket portion or recess 60 having an internal diameter 62 slightly greater in diameter than chamber diameter 36, thus intersecting at a shoulder 64, and an exterior diameter 66 smaller than that of threaded portion 58. Pocket portion 60 also includes an outer peripheral surface 68 and a nose or collar portion 70. As will be explained in more detail later, retainer 26 is adapted to be placed into pocket portion 60, as best seen in FIGS. 1B and 1C, and is bounded therein by shoulder 64. Pocket portion 60, by reason of its reduced wall thickness, relative to threaded portion 58, permits the subsequent swaging of at least nose or collar portion 70 over one edge surface of retainer 26 to withstand the internal pressure of valve 20 while keeping stem 24 axially fixed as well as keeping retainer 24 from rotating.

Continuing now with FIGS. 3, 3A, 3B, 3C and 3D, illustrated therein is stem 24, preferably also constructed of a metallic alloy, comprised of, on one end, of a generally cylindrical plug or plug portion 74, having a peripheral surface 76 and a predetermined diameter 78 adapted for a close tolerance fit relative to valve body chamber 32, as best seen in FIGS. 1B and 1C. Integral or contiguous with plug 74 and extending from one end thereof is an actuating portion 80. Plug 74 includes a first or primary, through, lateral passageway 84 of a diameter substantially similar to that of valve body through hole 44, with passageway 84, when plug 74 is fully seated in valve body chamber 32, in an open position of valve 20, being coaxial with through hole 44 as defined by inlet and outlet openings 40, 42 respectively, as best illustrated in FIGS. 1B and 1C, thereby providing a first flow path for fluid through valve 20.

Plug 74 further includes a second or auxiliary, smaller diameter, lateral passageway 86, normal to, emanating from and communicating first lateral passageway 84 with valve body chamber 32 at plug peripheral surface 76a that is 90 degrees angularly disposed or removed from plug first passageway 84. In addition, plug 74 also includes an end or first, conventional, circular, peripheral seal or O-ring receiving groove 88, extending circumferentially of plug portion 74 at the outer end thereof, adjacent to stem actuating portion 80. First groove 88 serves to retain and contain an elastomeric end or first seal or O-ring 90 that functions to seal stem 24 relative to valve body central chamber peripheral surface 34, Furthermore, plug 74 includes an intermediate or second seal groove 92 having a serpentine, undulating or labyrinth shape, with second groove 92 including first and second contiguous groove portions 94 and 96, respectively. Specifically, second seal first groove portion 94 is disposed above plug first lateral passageway 84 and thus, upon the installation of stem 24 in valve body 22, above valve body openings 44, 42 that define valve body lateral through bore 44. Second seal first groove portion 94 extends substantially semi-circumferentially of plug 74 and is parallel with adjacent first seal groove 88 as well as being axially located intermediate passageway 84 and first seal groove 88. The essentially diametrically opposed ends of second groove first portions 94 merge smoothly into second groove second portions 96 which extends downwardly below inlet/outlet portions 40/42 in an undulating manner as best seen in FIGS. 3 and 3C and is generally U-shaped when viewed in its angular extent. It should be understood that second undulating seal second receiving groove portion 96 is located and received in plug peripheral surface 76b, diametrically opposite from plug peripheral surface portion 76a, as well as being 90 degrees angularly removed or displaced from first lateral passageway 84. Describing same slightly differently, second seal second receiving groove portion 96 extends from one end of second seal first receiving groove portion 94 downwardly to below inlet/outlet openings 40/42 and then curves back upwardly, in mirror-image fashion, to seamlessly connect with the other end of seal groove portion 42.

An elastic or elastomeric intermediate or second seal or O-ring 98 of, for example a neoprene composition, as well as standard circular cross section and standard annular shape, upon its installation in second seal groove 92, assumes the previously-described shape thereof. Second seal or O-ring 98 is spaced apart from first seal or O-ring 90, thus defining therebetween, via plug peripheral surface 76b and valve body cylindrical surface 34, a closed volume 106 (not shown per se) without lateral passageway 84. Second seal or O-ring 98 therefore includes a first portion 100 contiguous with a second undulating portion 102, the latter being received in undulating second seal groove second portion 96, with portion 102, together with seal groove second portion 96, extending below inlet/outlet openings 40/42 such that one of inlet/outlet openings 40/42 is disposed outside of closed volume 104 when plug 74 is in a closed position, i.e., when plug surface portion 76b is aligned with inlet opening 40 and plug surface portion 76a, including plug second lateral passageway 86, is aligned with outlet opening 42.

One of the obstacles, prior to this invention that kept plug valves from being utilized in air conditioning service-type valve applications is that there are no commercially available O-ring compositions that are fully compatible with the R-22 refrigerant and mineral oil combination currently in use. Specifically, the obstacle resides in the swelling of the O-rings, in refrigerant applications, due to the absorption of the refrigerant medium. This obstacle is removed in this invention via the use of serpentine, labyrinth or undulating seal seat groove 92, as described, whose shape or geometries permit the initial or pre-stretching of O-ring 98 preferably in excess of about 15%, but not limited thereto, during the installation thereof, in order to offset or counteract the noted refrigerant absorption effects. If not initially stretched within the noted range, the O-ring circumferential extent, during use, becomes too large and the O-ring will become loose within its retaining groove. In addition, a second deleterious effect of the noted swelling is that it also causes the O-ring diameter to increase, thus increasing its cross sectional size, resulting in an undesirable frictional increase during stem rotation. Thus, it is preferable to use serpentine retaining groove 92 since it extends 360 degrees, in a convoluted manner, around the periphery of cylindrical plug 74. In the prior art designs, such as in previously noted U.S. Pat. Nos. 4,262,880 and 5,234,193, the inlet O-rings are housed or retained in only one curved side surface portion of their cylindrical stems, namely around their inlet passages or orifices. In this type of construction, there are no radially inwardly directed forces acting on these O-rings to keep same in their grooves, but rather only forces parallel or tangential to the longitudinal axes of the seals. In contrast thereto, as best diagrammatically illustrated in FIG. 7, in the present invention, when valve stem 24 is turned, particularly when it rotates past housing inlet hole 40, frictional turning forces (F-TURNING, in FIG. 7) from valve body 22 will act upon O-ring 98 but since its labyrinth design completely surrounds stem 24 in a specific undulating manner, the frictional forces act on O-ring 98 laterally and/or tangentially, with the radial components thereof being countered or opposed by the noted, inwardly-directed forces (F-STRETCH, in FIG. 7) on O-ring 98 resulting from the initial stretching thereof. In the previously-noted prior art constructions, when the O-ring is located only on the side of the stem and is stretched, the resulting forces do not act toward the longitudinal axis of the stem but will rather be parallel to the longitudinal axis thereof so that, when the frictional forces resulting from the turning of the stem act on the O-ring, they will be acting in the same direction as the stretch forces that complement or augment the frictional forces that cause the leading edge of the O-ring to move out of its retaining grove.

Continuing with the description of stem 24, actuating portion 80 thereof emanates from plug 74 at the latter's axial outer end surface 108 and includes a generally cylindrical central stem portion 110, of a predetermined axial extent, of reduced diameter, relative to plug 74, including a radially-extending stop member or pointer 112, best illustrated ion FIG. 3D. Adjoining cylindrical stem portion 110 is a tool receiving portion 114, preferably of hexagonal shape in cross section and adapted to permit a 90 degree rotation of stem 24 from open to closed position, and vice versa, of valve 20. Axially extending from the outer end surface of tool receiving portion 114 is a small diameter central service fitting 116 which includes an exteriorly threaded attachment portion 118 onto which a service hose fitting (not shown) can be threaded. Stem 24 also includes a central axial service passageway 120 that extends from plug lateral first through passage 84 fully through stem actuating portion 80 and which terminates into service fitting 116. Preferably, a valve core, of any desired known construction is fixedly retained within the axial outer end of service fitting 118, within axial service passageway 120.

Turning now to FIGS. 8 and 8A-8E, illustrated therein is a second embodiment 20' which includes a second embodiment of stem 24'. Since stem 24' has many structural portions and features in common with stem 24, like numerals are used for like parts, with the addition of a prime (') suffix. Stem 24' differs from stem 24 mainly in that plug 74' of stem 24' is comprised of an upper or female member 166 and a cooperating lower or male member 168 as best seen in FIGS. 8 and 8D. Male member 168 includes an internal, central, axial boss portion 170 having an axial key portion 172, best seen in FIG. 8D. Male boss portion 170, which is axially directed toward female member 166, is adapted to be interference-fitted, such as via a press fit, into a facing internal, central, axial, blind aperture 176 in female member 166, best seen in FIG. 8A. A key recess portion 178, in aperture 176, functions to receive male key portion 172, with key and key-receiving portions 172, 178 respectively, cooperating to inhibit any angular rotation between members 166 and 168. Completed stem assembly 24' is illustrated in FIG. 8E.

Plug 74' includes a first or end seal groove 88' that houses first or end seal or O-ring 90' (shown in FIGS. 6A, 6B) in the manner already previously-described. Plug 74', comprised of cooperating female member 166 and male member 168, as best shown in FIG. 8E, also includes a second or intermediate, undulating, labyrinth or serpentine seal or O-ring groove 192 that, while being similar to groove 92, differs therefrom in that its bottom surface 194 and adjoining, integral, side wall 196 are formed in female member 166 while its separate, opposite, side wall 198 is formed in male member 168, all in a manner known in the art. Thus, groove 192 is not formed until members 166 and 168 are fitted together, with FIG. 8C being an enlarged sectional view of second sealing groove 192, in its installed position, in FIG. 8E. In addition, each one of side walls 196, 198 includes an inwardly tapering or inclined lip portion 200 whose convergences aid in the retention of second or intermediate seal or O-ring 98' (shown in FIGS. 6A, 6B) in the manner already previously described. The remaining structures and functions of stem 24, such its the various passages and actuating portion 80', etc. are substantially similar to those already previously described, relative to stem 24, and will not be further described for the sake of brevity.

FIGS. 4A and 4B illustrate generally annular retainer member 26 which is adapted to be positioned around cylindrical actuating stem portion 110 as best illustrated in FIGS. 1B and 1C. Retainer 26, preferably constructed of a metallic alloy, is generally annular in shape, with its inner axial end surface 126 abutting plug axial outer end surface 108 upon its insertion around stem portion 110 and with its axial outer surface 128 preferably being provide with an instruction logo, such as "open" and an arrow for indicating the direction of rotation for "open". The outer peripheral surface 130 is provided with an undulating texture or pattern, such as repeated grooving 132. The inside diameter 134 of retainer 26 is smaller than diameter 78 of plug 74 so that, once retainer 26 is secured to valve body 22, stem 24 cannot be axially removed from valve body 22 when the latter contains a pressurized medium. Retainer 26 is preferably slip-fitted within housing pocket portion 60. Pattern 132 aids in the slip fitting process and upon the completion thereof, valve body nose or collar portion 70 is inwardly swaged over the intersection of pattern 132 and retainer outer end surface 128. This effectively not only axially restrains plug 74 but also inhibits the rotation of retainer 26. Retainer member inner diameter 134 is provided with a recessed angular portion 136 for receiving stem portion stop member or pointer 112, with recessed portion 136 having opposed end stop surfaces 138, 140 that limit the angular rotational movement of stop member 112 and consequently that of stem 24 to about 90 degrees.

Advancing now to FIGS. 5A and 5B, illustrated therein is a first embodiment of a cap 28 for sealing valve central chamber or cavity 74 and protecting the part of actuating portion 80 of stem 24 protruding therefrom. Cap 28, which may be of metallic or plastic construction, depending on the expected operational environment, includes a base 144 having an interiorly-threaded portion 146 as well as a textured or patterned annular exterior surface 148, such as repeated grooving, for example, for enhancing its operator-gripping properties. Base portion 144 merges smoothly into an integral or contiguous, generally truncated cone portion 150 which, together with the interior volume of base portion 144, forms an internal cavity 152. Cap threaded portion 146 is adapted to operatively mate with valve body exteriorly threaded portion 58. In addition, the inner surface of base portion 144 is provided with an interference diameter portion 156 and a smaller diameter gland or recess 158 that serves to house an elastomeric third or cap seal or O-ring member 160 which, in turn, is adapted for sealing against the curved outer surface 72 (after swaging) of housing pocket portion 60. The nose or collar 70 of housing 22, together with cap interference diameter portion 156, can for example, be designed and produced according to the teachings of U.S. Pat. No. 6,546,952B1, to Martin et al., which is also assigned to the assignee of the present invention. The Martin et al., construction requires that nose or collar 70 be swaged over retainer 26 before cap 28 can be attached to valve body 22, otherwise cap 28 does not fit on valve body 22 which in turn signifies that stem 24 is not retained within valve body cavity 32. As a result, the manufacturer is provided with simple verification that stem 24, in fact, is not structurally retained within valve body 22.

Proceeding now to FIGS. 5C, 5D and 5E, illustrated therein is a second embodiment of protective or sealing cap 28' which can also be a component of second embodiment 20' of the Plug-Style Air-Conditioning Service Valve of the present invention. Since cap 28' is similar to cap 28, like numerals are used for like parts, with the addition of a prime (') suffix. Cap 28' differs from cap 28 in that generally-truncated cone portion 150' of the former includes a plurality of circumferentially-spaced, longitudinally extending, reinforcing rib portions 151 which also enhance its operator gripping properties. In addition, portion 150' is provided with a generally circular outer end surface 153 having a tool-receiving recess 154, such as of hexagonal peripheral geometry to accept a wrench, for example. Recess 154 is of advantage when space is very tight and direct hand access may be difficult.

Furthermore, at least one of the inner and outer peripheral wall surfaces 159a, 159b of gland or cap inner recess portion 158' is provided with a peripheral thread portion 162, shown in detail in FIG. 5E. Thread portion 162 functions not only to retain O-ring seal 160' within recess portion 158 due to its inherent helical angulation, but also has the added advantage of allowing gradual pressure equalization between cavity 152' and the outside atmosphere with even only a partial turn or rotation of cap 28'.

In terms of the operation of valve 20, stem actuating portion axial service passageway 120 and second or auxiliary lateral passageway 86 have their inner ends merging into first or primary lateral passageway 84 to allow service fitting 118 to "communicate" with the air conditioning system fluid when valve 20 is in the closed position, which is illustrated in FIG. 6B. As previously noted, stem 24 locates traditional first seal or O-ring 90. When the air conditioning condensing unit is pre-charged, valve 20 is in the closed position, and in this closed position, serpentine second seal or O-ring 98 is positioned in-line with valve body lateral through hole 44 which, in turn, is attached, via one of tubings 52, to the condensing unit. This traps the refrigerant medium between traditional O-ring 90 and serpentine or undulating O-ring 98. It is important to understand that, upon the opening of valve 20, the refrigerant medium is trapped below undulating O-ring 98, as illustrated in FIG. 6A, thus allowing traditional O-ring 90 to act as a redundant or secondary seal. As noted, stem 24 includes tool receiving portion 114, for tool location, to permit 90 degree rotation of stem 24 from the open to the closed position and vice versa. Furthermore, stop member 112, which also serves as a pointer, is positioned within retainer recessed portion 136. In addition, retainer 26 is positioned within valve body 22 in a manner so as to allow valve 20 to be in the open position when pointer 112 is contacting open-stop surface 138. Similarly, valve 20 is in the closed position when pointer 112 is contacting closed-stop surface 140.

Figure 10:
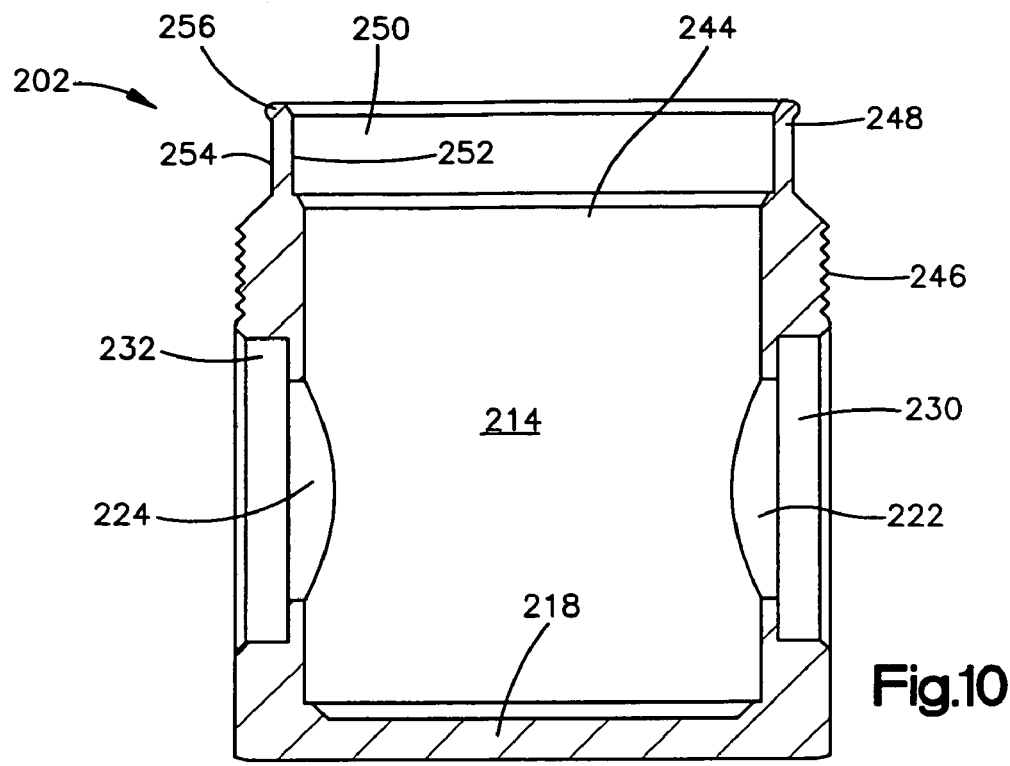
FIG. 10 is a sectional view of a valve body of the plug style air conditioning service valve of FIG. 9.

FIG. 9 is an exploded view of yet another embodiment of a plug style air conditioning service valve 200 constructed in accordance with the present invention. The main components of the valve 200 of FIG. 9 include valve body 202, stem 204, retainer 206, and cap 208. FIG. 10 is a sectional view of the valve body 202. Preferably, the valve body 202 is constructed of a metallic alloy and has a hexagonally-shaped outer surface 212 (FIG. 9). Valve body 202 includes a longitudinal, central, generally cylindrical chamber 214, cavity or bore, having a cylindrical inner surface 216 and a predetermined inner diameter. The chamber 214 ends at a closed bottom wall 218 of the valve body 202. The chamber 214 is sized for receiving the stem 204. Valve body 202 further includes lateral, coaxial ports, or openings 222 and 224. The inner surface 216 of the valve body 202, at a location adjacent the openings 222 and 224, is chamfered or relieved to remove any sharp edges at the intersection of the opening and the inner surface. This chamfer adjacent the openings 222 and 224 helps to protect against abrasion of a seal 228 (FIG. 14B, discussed in detail below) located on the stem 204 during opening and closing of the valve 200. The valve body 202, at an intersection of the outer surface 212 and openings 222 and 224 also includes pockets 230 and 232 respectively, into which the ends of tubing portions, such as those shown as 236 and 238 in FIG. 9, can be inserted and attached to the valve body 202, such as by brazing. Also, a pair of mounting holes 240 (FIG. 9) is located near the closed end of the valve body 202.

Figure 11:
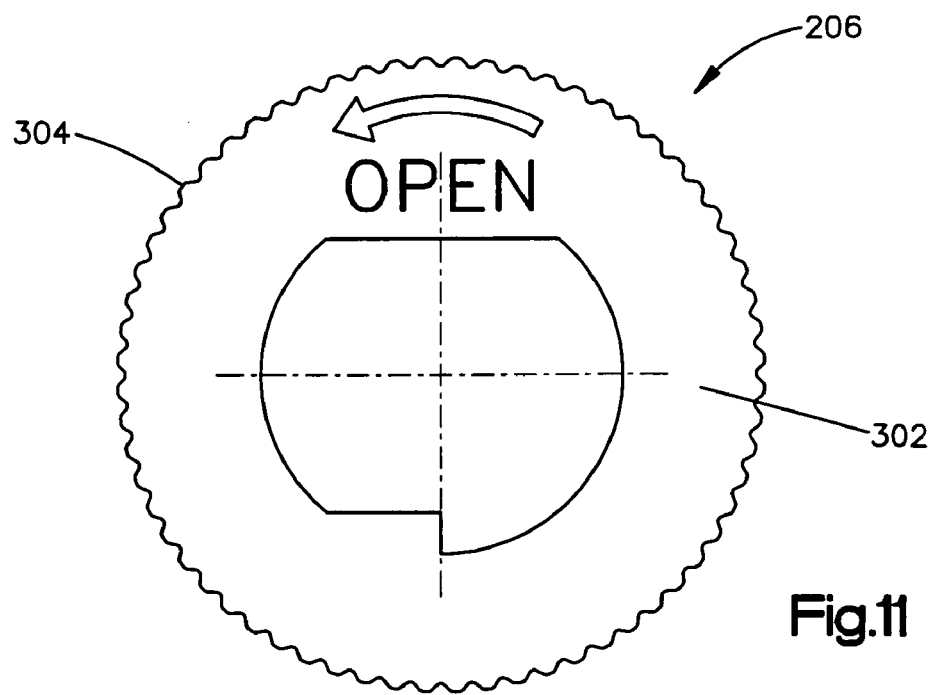
FIG. 11 is a top plan view of a valve retainer member of the plug style air conditioning service valve of FIG. 9.
Figure 13A:
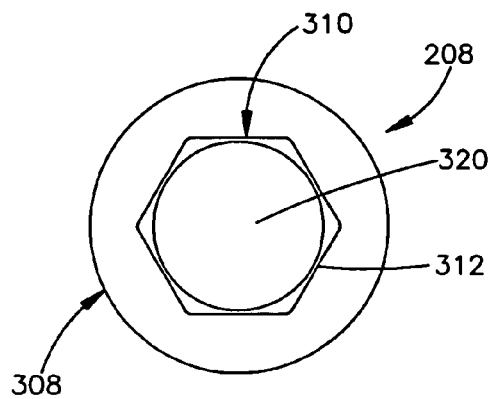
FIGS. 13A-13E illustrate various views of a cap of the plug style air conditioning service valve of FIG. 9.
Figure 13B:
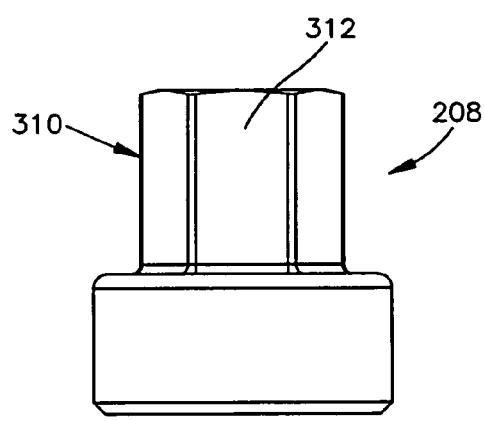
Figure 13C:
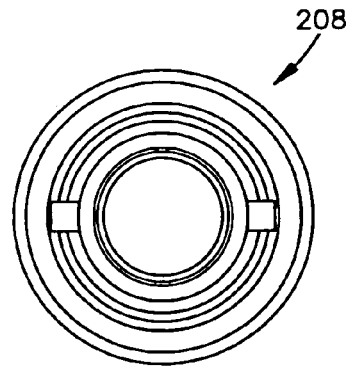
Figure 13D:
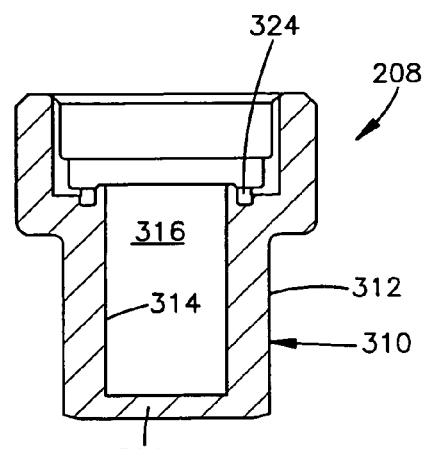
Figure 13E:
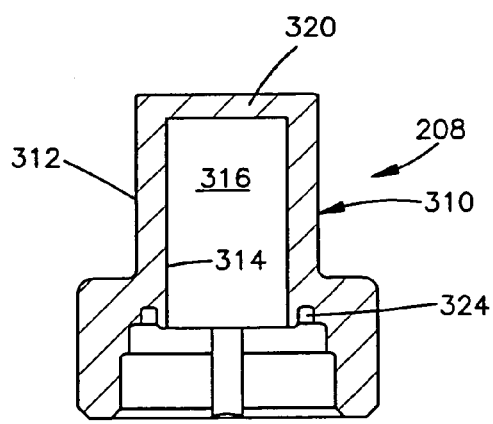

The outer surface 212 of the valve body 202, near the open end 244 of chamber 214, includes a threaded portion 246 and an integral, or contiguous, longitudinally extending, cylindrical protrusion 248 that defines a pocket portion 250 or recess at the open end of the chamber. The pocket portion 250 has an internal diameter that is slightly greater than the chamber diameter. A shoulder 252 is located at the bottom of the pocket portion 250. In the embodiment shown in FIG. 10, an exterior diameter of the cylindrical protrusion 248 is smaller than that of threaded portion 246 of the valve body 202. The cylindrical protrusion 248 illustrated in FIG. 10 also includes an outer peripheral surface 254 and a nose 256 or collar portion. The retainer 206 illustrated in FIG. 11 is adapted to be placed into the pocket portion 250 and to abut against the shoulder 252. The cylindrical protrusion 248 is adapted to allow the subsequent swaging of at least nose 256 over an edge surface of retainer 206 to retain the stem 204 within the chamber 214 and to prevent the retainer 206 from rotating.

Continuing now with FIGS. 12A, 12B and 12C, illustrated therein is the stem 204. Preferably, the stem 204 is constructed of a metallic alloy. The stem 204 includes a plug portion 260 and an actuating portion 262. In the illustrated embodiment, the actuating portion 262 is integral or contiguous with and extends from one end of the plug portion 260. The plug portion 260 includes a generally cylindrical peripheral surface 264 having a predetermined diameter. The plug portion 260 is adapted for a close tolerance fit within the chamber 214 of the valve body 202.

Figure 14A:
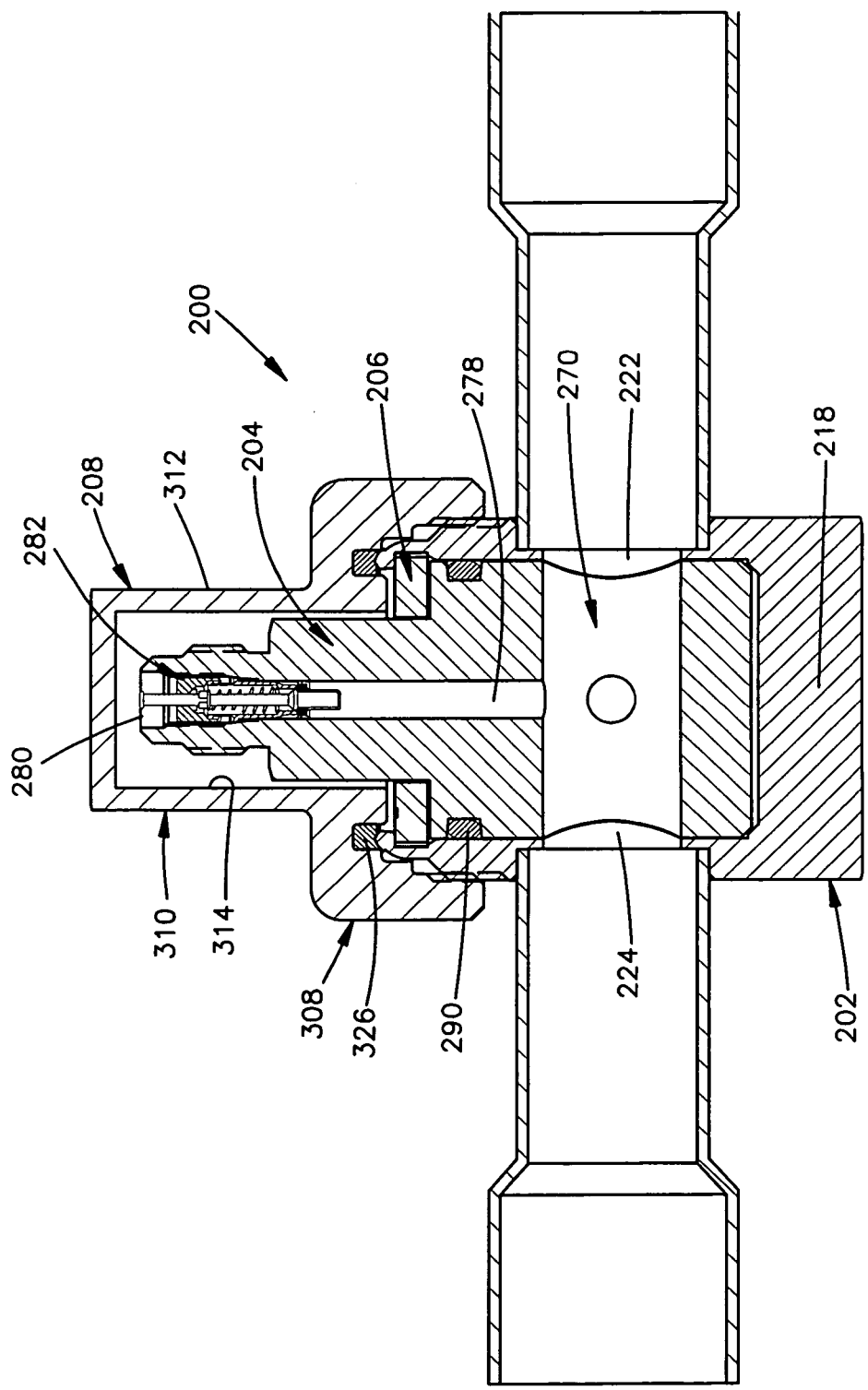
FIG. 14A is a longitudinal sectional view of the valve of the FIG. 9, with a stem of the valve in an open position.

A passageway 270 extends laterally through the plug portion 260 of the stem 204. The passageway 270 has a diameter that is substantially similar to that of the openings 222 and 224 in the valve body 202. When the plug portion 260 of the stem 204 is located within the chamber 214 of the valve body 202, the passageway 270 may be positioned in fluid communication with the openings 222 and 224 to place the valve 200 in an open position, as shown in FIG. 14A. When the valve 200 is in the open position, fluid may pass into the valve 200 through one opening 222, through the passageway 270, and out of the valve 200 through the other opening 224. When the plug portion 260 of the stem 204 is located within the chamber 214 of the valve body 202, the passageway 270 also may be positioned out of in fluid communication with the openings 222 and 224 to place the valve 200 in a closed position, as shown in FIG. 14B.

The plug portion 260 also includes a smaller diameter, lateral passageway 272 (FIG. 14B) that extends in one direction from passageway toward 270 the peripheral surface 264. Preferably, the smaller diameter passageway 272 is normal to passageway 270. The smaller diameter passageway 272 is in fluid communication with passageway 270 and provides a fluid flow path laterally from the passageway 270 to outside the plug portion 260 of the stem 204. In the embodiment of the stem 204 illustrated in FIGS. 12B and 12C, the small diameter passageway 272 terminates at a recess 274 formed in the peripheral surface 264 of the plug portion 260 of the stem 204. A longitudinal extending passageway 278 (FIGS. 14A and 14B) also extends through the stem 204 and into communication with the passageway 270. The longitudinally extending passageway 278 extends from an end surface 280 of the actuating portion 262 into fluid communication with passageway 270. The longitudinally extending passageway 278 provides a service access for enabling testing of fluid conditions (such as fluid pressure), removal, and addition of fluid to a system having the valve 200. A small valve core 282, or other suitable valve, may be located in the longitudinally extending passageway 278 to prevent undesired fluid flow out of the passageway.

The plug portion 260 includes an annular surface 286 that surrounds the union of the plug portion 260 with the actuating portion 262. A groove 288 for receiving a seal 290 (FIGS. 14A and 14B), such as an O-ring, is located in the peripheral surface 264 of the plug portion 260 at a location adjacent the annular surface 286. The groove 288 extends circumferentially around the peripheral surface 264 of the plug portion 260. The seal 290, received in the groove 288, extends between the peripheral surface 264 of the plug portion 260 and the inner surface 216 of the valve body 202 for sealing the chamber 214 and preventing fluid loss from the valve 200.

The plug portion 260 of the stem 204 also includes a groove 294 that extends into the peripheral surface 264 and defines a fluid blocking portion 296 of the plug portion 260. In the stem 204 illustrated in FIGS. 12A and 12B, the fluid blocking portion 296 is located diametrically opposite the recess 274 and located perpendicular to and approximately equidistant about the peripheral surface 264 from the openings to the passageway 270. The groove 294 illustrated in FIG. 12A is circular. The groove 294, however, may be a shape other than circular, for example, oval. In a preferred embodiment, at least the surface 298 forming the groove that is located nearest the fluid blocking portion 296 is dovetailed, as shown in FIG. 12 D. The dovetailed surface 298 forms a lip on the periphery surface 264 of the fluid blocking portion 296 for helping to retain the seal 228 within the groove 294.

The fluid blocking portion 296 of the plug portion 260 is larger than its corresponding opening 222 in the valve body 202. Thus, when the plug portion 260 is located in the chamber 214 of the valve body 202 and the fluid blocking portion 296 is aligned with the corresponding opening 222, the groove 294 is located radially outward relative to the corresponding opening 222 and, the seal 228 is retained in the groove 294 engages the inner surface 216 of the valve body 202 at a location surrounding the corresponding opening 222.

The seal 228 that is received in the groove 294 is preferably an elastomeric O-ring seal having a circular cross sectional shape. In one embodiment of the invention, the seal 228 is coated with a material, such as Parylene type "N." The coating is an anti-abrasion coating that provides enhanced seal lubricity, enhanced wear resistance, and helps to restrict fluid absorption by the seal 228, thus restricting swelling of the seal. When the seal 228 is coated with Parylene, or a similar material, an application of a refrigerant-friendly, silicone based lubricant may be applied to the seal 228. Preferably, the coating has a thickness of approximately 0.0005 to 0.0008" inches thick. Alternatively, or in addition to the lubricant, the sealing surfaces contacted by the seal 228 may be burnished or smoothed.

One of the obstacles, prior to this invention, that kept plug valves from being utilized in air conditioning service-type valve applications is that there are no commercially available O-ring compositions that are fully compatible with both refrigerants, such as R22 or R410a, and their common associated oils, such as mineral oil and POE oil. Specifically, the obstacle resides in the swelling of the O-rings due to one of the refrigerant or the oil. O-rings material that are stable in the refrigerants are not stable in the oils. Likewise, O-rings that are stable in the oils are not stable in the refrigerants. As a result, prior to the present invention, O-rings located in the refrigerant/oil mixture absorb one of the substances and swell. This obstacle is removed in this invention via the use of the groove 294 that is sized sufficiently large relative to the seal 228 so that the seal is stretched by at least a predetermined amount when retained in the groove 294. Preferably, the predetermined amount of stretch of the seal 228 is in excess of about 15%, but not limited thereto. The predetermined amount of stretch is an amount sufficient to offset or counteract the noted refrigerant absorption effects.

FIG. 11 illustrates the retainer 206 of the plug style air conditioning service valve 200. The retainer 206 is similar to the retainer described above with reference to FIGS. 4A and 4B. The retainer 206, preferably constructed of a metallic alloy, is generally annular in shape. An inner axial end surface of the retainer 206, when assembled onto the stem 204, abuts the annular surface 286 of the plug portion 260. An axial outer surface 302 of the retainer 206 preferably is provided with an instruction logo, such as "open" and an arrow for indicating the direction of rotation for opening the valve 200. An outer peripheral surface 304 is provided with an undulating texture or pattern, such as repeated grooving.

FIGS. 13A-13E illustrate cap 208 for helping to seal the valve 200 and for protecting the actuating portion 262 of the stem 204. The cap 208, which may be of metallic or plastic construction, includes a generally cylindrical base 308 having an interiorly-threaded portion that is adapted to be received on the threaded portion 246 of the valve body 202. The cap 208 also includes an upper portion 310 having a hexagonal outer surface 312 and an inner surface 314 that defines a chamber 316 that is closed on one end by an upper surface 320 of the cap 208. The chamber 316 is sized to receive the portion of the stem 204 that protrudes from the valve body 202 when the plug portion 260 is received in the chamber 214. A groove 324 (FIGS. 13D and 13E) located in the cap 208 is adapted to receive a seal 326 (FIGS. 14A and 14B), such as an O-ring, for sealing between the cap 208 and the valve body 202.

FIGS. 14A and 14B illustrate the plug style air conditioning service valve 200 in an assembled condition. FIG. 14A illustrates the plug style air conditioning service valve 200 with the stem 204 in an open position. In the open position, the passageway 270 through the plug portion 260 of the stem 204 provides a fluid flow path between the openings 222 and 224 of the valve body 202 to enable fluid to flow through the valve 200. FIG. 14B illustrates the plug style air conditioning service valve 200 with the stem 204 in a closed position. In the closed position, fluid flow through the valve 200 is prevented. The seal 228 extends between the plug portion 260 of the stem 204 and the valve body 202 and surrounds the opening 222 to prevent fluid from flowing from the opening 222 through the valve 200. Also, when the stem 204 of the plug style air conditioning service valve 200 is in the closed position, the longitudinal passageway 278 is in fluid communication with passageway 272 so as to enable the removal or addition of refrigerant from a system having the valve 200.

It is deemed that one of ordinary skill in the art will readily recognize that the several embodiments of the present invention fill a remaining need in this art and will be able to affect various changes, substitutions of equivalents and various other aspects of the present invention as decribed herein. Thus, it is intended thet the protection granted hereon be limited only by the scope of the appended claims and their equivalents.

What is claimed is:

1. An air conditioning service plug-type valve, comprising:
   a valve body having a chamber, first and second openings extending through the valve body;
   a stem having an actuating portion and a plug portion, the plug portion configured for being received in the chamber of the valve body, the stem, when the plug portion is received in the chamber, being rotatable relative to the valve body between a closed position blocking fluid communication between the first and second openings of the valve body and an open position forming a first fluid passageway between the first and second openings of the valve body, the plug portion including a fluid blocking portion located immediately adjacent the first opening when the stem is in the closed position, a groove extending into a peripheral surface of the plug portion defining the fluid blocking portion, wherein the stem includes a second fluid passageway between the second opening of the valve body and the actuating portion of the stem when the stem is in the closed position;
   an actuatable valve located in the second fluid passageway in the actuating portion of the stem; and
   a seal disposed in the groove and extending between the plug portion and the valve body.

2. The air conditioning service plug-type valve of claim 1, wherein the seal, when located in the groove, being stretched by at least a predetermined amount in excess of about 15%, sufficient to offset refrigeration medium absorption effects thereon.

3. The air conditioning service plug-type valve of claim 1, wherein the seal surrounds the first opening when the stem is in the closed position.

4. The air conditioning service plug-type valve of claim 3, wherein the fluid blocking portion is one of a circular and an oval shape.

5. The air conditioning service plug-type valve of claim 3 wherein the groove includes at least one dovetailed surface, the at least one dovetailed surface helping to retain the seal in the groove.

6. The air conditioning service plug-type valve of claim 1, wherein the valve body includes an open end and a closed end, when the plug portion of the stem is received in the chamber of the valve body, a second seal extends between the plug portion and the valve body at a location adjacent the open end for preventing fluid flow out of the valve between the stem and the valve body.

7. The air conditioning service plug-type valve of claim 1, wherein a lateral portion of the second fluid passageway extends perpendicular to the first fluid passageway in a direction opposite the fluid blocking portion of the plug portion of the stem, and a longitudinal portion of the second fluid passageway extends from the first fluid passageway, through the actuating portion of the stem and terminates at an opening on an upper surface of the actuating portion of the stem.

8. The air conditioning service plug-type valve of claim 7, wherein the lateral portion of the second fluid passageway terminates in a recess formed on the plug portion of the stem at a location opposite the fluid blocking portion.

9. The air conditioning service plug-type valve of claim 1, further including a cap that is attachable to the valve body for covering the actuating portion of the stem, the cap including a portion with a hexagonal outer surface.

10. The air conditioning service plug-type valve of claim 1, wherein the seal includes an anti-abrasion coating that provides enhanced seal lubricity and enhanced wear resistance.

11. The air conditioning service plug-type valve of claim 10, wherein the coating further helps to restrict fluid absorption by the seal, thereby restricting swelling of the seal.

12. The air conditioning service plug-type valve of claim 10, wherein the coating is approximately 0.0005 to 0.0008 inches thick.

* * * * *